United States Patent
Nadeau et al.

(10) Patent No.: US 12,189,051 B2
(45) Date of Patent: Jan. 7, 2025

(54) DISCRETE TIME ADAPTIVE NOTCH FILTER

(71) Applicant: SRC, Inc., North Syracuse, NY (US)

(72) Inventors: Andrew Nadeau, Rochester, NY (US); John C Dougherty, Liverpool, NY (US)

(73) Assignee: SRC INC, North Syracuse, NY (US)

( * ) Notice: Subject to any disclaimer, the term of this patent is extended or adjusted under 35 U.S.C. 154(b) by 489 days.

(21) Appl. No.: 17/408,056

(22) Filed: Aug. 20, 2021

(65) Prior Publication Data

US 2023/0058231 A1 Feb. 23, 2023

(51) Int. Cl.
*G01S 7/292* (2006.01)
*G01S 7/35* (2006.01)

(52) U.S. Cl.
CPC .............. *G01S 7/292* (2013.01); *G01S 7/354* (2013.01)

(58) Field of Classification Search
CPC .......... G01S 7/292; G01S 7/354; G01S 13/52; G01S 13/5244; G01S 13/5246; G01S 13/526; G01S 13/53
See application file for complete search history.

(56) References Cited

U.S. PATENT DOCUMENTS

| | | | | |
|---|---|---|---|---|
| 5,304,940 A * | 4/1994 | Harasawa | ............. | G01S 7/2921 327/551 |
| 7,167,884 B2 * | 1/2007 | Picciolo | .................. | G01S 7/292 708/322 |
| 10,598,765 B2 * | 3/2020 | Hode | .................. | H03H 17/0213 |
| 2011/0074621 A1 * | 3/2011 | Wintermantel | ...... | H01Q 1/3233 342/70 |
| 2018/0011169 A1 * | 1/2018 | Nakayama | .............. | G01S 13/66 |
| 2018/0106884 A1 * | 4/2018 | Marr | ........................ | G01S 7/354 |
| 2020/0011988 A1 * | 1/2020 | Nakayama | .............. | G01S 7/415 |
| 2020/0025871 A1 * | 1/2020 | Subburaj | ................. | G01S 7/414 |
| 2021/0116534 A1 * | 4/2021 | Hode | ................. | H03H 17/0213 |
| 2022/0244349 A1 * | 8/2022 | Wintermantel | ....... | G01S 7/4008 |

OTHER PUBLICATIONS

Nehorai, "A Minimal Parameter Adaptive Notch Filter with Constrained Poles and Zeros," IEEE Transactions on Acoustics, Speech, and Signal Processing, ASSP-33(4):983-96 (1985).

(Continued)

*Primary Examiner* — Peter M Bythrow
(74) *Attorney, Agent, or Firm* — Jonathan L. Gray; Bond, Schoeneck & King PLLC

(57) ABSTRACT

A discrete-time, digital filter for notch filtering a complex digital signal, the filter having a transfer function allowing selective filtering of complex signal components. A system for receiving a modulated signal, the system including a processor for adaptively generating filter coefficients of a discrete-time, digital filter, for filtering a complex discrete-time signal, the processor configured to (i.) identify a number of signal samples in a discrete-time signal, and use the signal samples to calculate autocorrelation values sufficient to calculate the filter coefficients, (ii.) solve a system of equations, the system of equations defined by a Toeplitz matrix and a vector to determine the coefficient values, the Toeplitz matrix defined using the autocorrelation values, and the vector defined as the autocorrelation values of a white noise signal.

20 Claims, 6 Drawing Sheets

(56) References Cited

OTHER PUBLICATIONS

John G. Proakis and Dimitris G. Manolakis. 1996. Digital signal processing (3rd ed.): principles, algorithms, and applications. Prentice-Hall, Inc., USA. pp. 852-857.

Wikipedia, "Digital Filters," https://en.wikipedia.org/wiki/Digital_filter (printed Aug. 18, 2021).

* cited by examiner

DISCRETE TIME ADAPTIVE NOTCH FILTER

GOVERNMENT RIGHTS

This invention was made with government support under grant number Software Improvements contract W15P7T-12-D-M603 awarded by Missiles and Space Intelligence Center (MSIC). The government has certain rights in the invention.

FIELD

Methods of and apparatus for digital filtering, and in particular methods of and systems for digital, notch filtering

BACKGROUND

Digital filters operate on sampled, discrete-time signals to attenuate or enhance certain aspects of the signal. As is understood in the art of signal processing, all time-varying signals, including digital representations of signals, are comprised of sinusoidal frequency components. In certain applications of signal processing, it is desirable to attenuate narrow-band (or single frequency) components (commonly referred to as "tones") of a signal. Such filters are referred to as notch filters and, in the case of digital signal filtering, such filters are referred to as digital notch filters.

A digital filter system may include an analog-to-digital converter (ADC) to sample a continuous input signal to form a digital representation of the input signal in preparation for filtering and a digital-to-analog converter (DAC) to regenerate a continuous representation of the signal after filtering, as well as other signal transmission and processing components.

A filter may be applied using an electrical component such as a general purpose microprocessor or a microcontroller (i.e., using software), or may be implemented in a more specialized component such as a field-programmable gate array (FPGA) or an application specific integrated circuit (ASIC) or a digital signal processor (DSP). Realization and application of a filter typically include peripheral components such as memory to store filter coefficients, signal data and/or information regarding filtering calculations.

A digital filter may be characterized in a frequency domain by a transfer function, and in a time domain by an impulse function or a difference equation. It is often convenient to design a filter by specifying performance in a frequency domain using a transfer function (e.g., by specifying cut-off frequencies).

A transfer function, H(z), specifies a system's ability to process various frequencies comprising a signal and is quantified as a ratio of a filter's output as a function of frequency Y(z) to the filter's input as function of frequency X(z), where z is a complex-frequency variable. A general representation of a transfer function H(z) is shown in Equation 1.

$$H(z^{-1}) = \frac{b_0 + b_1 z^{-1} + b_2 z^{-2} + \ldots + b_N z^{-N}}{1 + a_1 z^{-1} + a_2 z^{-2} + \ldots + a_M z^{-M}} \quad \text{Equation 1}$$

To specify the performance of a given filter, a transfer function is commonly arranged with each of the numerator and the denominator formatted as one or more factors. Values of z for which the factors of the numerator are equal zero are commonly referred to as zeros, and values of z for which the factors of the denominator equal zero are commonly referred to as poles. Components of the input signal near the zeros of H(z) in the z-domain will be attenuated by the filter, and components of the input near the poles of H(z) will be amplified.

The transfer function of a filter is equal the z-transform of the filter's impulse function; and, as is known in the art, by using appropriate formatting of the transfer function, the coefficients of a difference equation of the filter can be obtained for implementation in electronics.

A filter having a given transfer function may be implemented in electronics using any of a number of alternative configurations, each way having unique architecture speed, memory demands, numerical stability and round-off error, but providing the same filtering properties under nominal conditions. Each zero is indicative of a feedforward signal component (each implemented in electronics as a weighted feedforward tap, where the signal component is amplified by a corresponding value, $b_n$) and each pole is indictive of a feedback signal component (each implemented in electronics as a weighted feedback tap, where the signal component is amplified by a corresponding value, $a_n$).

Digital filters can be characterized as finite impulse response filters (FIRs) or infinite impulse response (IIR). IIR filters are filters having one or more poles (i.e., feedback signal component) and having an impulse response that lasts indefinitely; IIR filter may also have one or more zeros (i.e., feedforward signal components). FIR filters are filters having one or zeros, and no poles. Each type of filter has numerous advantages and disadvantages, with IIR filters being, generally, known to be more computationally efficient.

FIGS. 1A and 1B are general, representative, schematic illustrations of IIR digital filters 100, 150 that filter a discrete-time input signal x[n] in which delays 110a-110f provide selected amounts of delay to implement feedback and feedforward, and amplifiers 120a-120i provide amplification/attenuation factors $a_1$-$a_2$ and $b_0$-$b_2$. Adders 130a-130g combine the amplified signals to form an output signal y[n]. It is understood that the numbers of delays and amplifiers is representative, and the numbers can be varied to implement a given filter. Also, it is understood that the topologies shown in FIGS. 1A and 1B are examples of filter designs that allow for different implementations of a filter having a same transfer function.

In certain applications of signal processing, it is desired to eliminate narrow-band or sinusoidal wave components from a signal. For example, it may be desired to eliminate a sinusoidal power grid tone (e.g., 50 or 60 Hz) that has been coupled into a communication signal.

Elimination of such noise may be accomplished by fixed notch filters (i.e., filters in which attenuation factors do not vary over time). Ideally, notch filters provide unit gain (i.e., an amplification of 1) at all frequencies, except at one or more specific frequencies that are to be eliminated, where their gain is zero. However, when the frequencies of the unwanted signal components are unknown or possibly time varying, filters having notches located at fixed frequencies are not appropriate, and it is necessary to apply adaptive notch filtering where characteristics of a signal-to-be-filtered are determined, and specification of the filter attenuation factors may be varied over time as needed.

Examples of applications of adaptive notch filters include areas such as radar systems, communications systems, control systems, optical systems, ultrasound systems and sonar systems.

Pole-zero configuration of an example of a conventional discrete-time notch filter is schematically illustrated in FIG. 2. For the illustrated filter, the zeros 0 of the filter are located on the unit circle in the z-plane (i.e., /z/=1) at the angular frequencies (i.e., ω=tan$^{-1}$ Imaginary(z)/Real(z)) to be eliminated, and each of the poles X is located inside the unit circle at the same angle (ω) as its corresponding zero. The poles are located as close as possible to zeros to allow for elimination of the desired frequency while limiting the impact on the remainder of the signal.

The transfer function H of such a notch filter as depicted in FIG. 2 can be expressed as shown in Equation 2, where the order of the numerator 2N and denominator N are, respectively, indicative of the number poles and zeros that a given filter has. The notch filter described by Equation 2 has an equal number of zeros and poles, 2N. The coefficients $a_1 \ldots a_N$ define the locations of the poles and the coefficients $a_1 \ldots a_N$ multiplied by a factor $\rho$ (where $\rho<1$) define the locations of the poles.

$$H(z^{-1}) = \frac{1 + a_1 z^{-1} + a_2 z^{-2} + \ldots + a_N z^{-N} + \ldots + a_1 z^{-2N+1} + z^{-2N}}{1 + \rho a_1 z^{-1} + \ldots + \rho^N a_N z^{-N} + \ldots + \rho^{2N-1} a_1 z^{-2N+1} \rho^{2N} z^{-2N}} \quad \text{Equation 2}$$

A filter such as the one defined by Equation 2, while useful in providing notch filtering, is limited in the types of signals that can be filtered.

A discussion of the filter defined by Equation 2 and a technique for adapting the characteristics of the notch filter depicted in FIG. 2 is given in A MINIMAL PARAMETER ADAPTIVE NOTCH FILTER WITH CONSTRAINED POLES AND ZEROS by A. Nehorai in IEEE Transactions on Acoustics, Speech and Signal Processing Vol. ASSP-33 No. 4, August 1985. Said article discloses a technique for adapting the characteristics of the filter relies on minimizing a measure of square error iteratively using a gradient descent process. This process is limited in its convergence rate, can fail to converge under certain conditions and has other limitations.

SUMMARY

As is well-known in the art, periodic signals, in their most general form, can be described as sinusoids having an in-phase component (I) and a quadrature component (Q).

As determined by the inventors, a filter having a transfer function as set forth in Equation 2 allows for the selection of N different frequencies; however Equation 2 has 2N zeros. In particular, for each value N, a filter as described by Equation 2 specifies a first zero and another zero that is the complex conjugate of the of the first zero. Accordingly unless, in a given application, a signal component and a signal component corresponding to the complex conjugate of that signal component are both to be eliminated from the signal, both components will be eliminated and the filtered signal will be unnecessarily distorted. Set forth herein is a filter capable of attenuating a signal component without also attenuating the component's complex conjugate. Accordingly, a filter according to aspects of the present invention is capable of filtering complex noise signals (i.e., signals having a both an in-phase (I) component and a quadrature (Q) component); however, distortion related to filtering of the complex conjugate is avoided, thereby reducing signal distortion arising from the filtering.

An aspect of the invention is directed to a discrete-time, digital filter for notch filtering a complex digital signal, the filter having a transfer function of $$H(z^{-1}) = \frac{1 + a_1 z^{-1} + a_2 z^{-2} + \ldots + a_N z^{-N}}{1 + \rho a_1 z^{-1} + \rho^2 a_2 z^{-2} + \ldots + \rho^N a_N z^{-N}}$$

In some embodiments, the filter is an adaptive filter.

The filter may be embodied in a microprocessor or a microcontroller or a field-programmable gate array (FPGA) or an application specific integrated circuit (ASIC).

Another aspect of the invention is directed to signal transmission system, comprising a demodulator to receive a modulated signal and form a complex baseband signal, and a filter to remove one or more noise components from a digital representation of the baseband signal. The filter has one or more zeros at one or more complex frequencies corresponding to the one or more noise components, and the filter does not have a zero at a complex conjugate of the one or more complex frequencies. The at least one of the noise components may be produced by a noise source that is external to the system.

The filter may be described by a transfer function of $$H(z^{-1}) = \frac{1 + a_1 z^{-1} + a_2 z^{-2} + \ldots + a_N z^{-N}}{1 + \rho a_1 z^{-1} + \rho^2 a_2 z^{-2} + \ldots + \rho^N a_N z^{-N}}$$

In some embodiments, the demodulator is configured to demodulate the modulated signal by mixing the modulated signal with a first signal and mixing the modulated signal with a second signal that is 90-degrees out of phase with the first signal.

In some embodiments, the system comprises an analog-to-digital convertor to sample the signal prior to demodulation by the demodulator, and the demodulator uses a discrete Hilbert transform. In some embodiments, the system comprises an analog-to-digital convertor to sample the signal after demodulation by the demodulator to form the digital representation.

The transmission system may be a radar system.

The filter may be embodied in at least one of a microprocessor, a microcontroller, a field-programmable gate array (FPGA) or an application specific integrated circuit (ASIC), or a digital signal processor (DSP).

In some embodiments, the filter is an adaptive filter.

In some embodiments, the system further comprises a coefficient calculation subsystem comprising at least one processor configured to receive the discrete-time signal, the at least one processor configured to (i.) identify a number of signal samples in a discrete-time signal, and use the signal samples to calculate autocorrelation values sufficient to calculate filter coefficients of the filter, and (ii.) solve a system of equations, the system of equations defined by a Toeplitz matrix and a vector to determine the coefficient values, the Toeplitz matrix defined using the autocorrelation values, and the vector defined as the autocorrelation values of a white noise signal.

Yet another aspect of the invention is directed to a method of removing N narrowband signal components from a signal, the method comprising processing a digital representation of the signal with a filter having a transfer function of $$H(z^{-1}) = \frac{1 + a_1 z^{-1} + a_2 z^{-2} + \ldots + a_N z^{-N}}{1 + \rho a_1 z^{-1} + \rho^2 a_2 z^{-2} + \ldots + \rho^N a_N z^{-N}}$$

to remove the N components from the signal.

In some instances, at least one of the components is a complex sinusoid.

The method may further comprise demodulating a modulated representation of the signal prior to the processing step to form a demodulated representation of the signal.

The method may further comprise sampling the demodulated representation of the signal after the step of demodulating. The step of demodulating may be accomplished using a discrete Hilbert transform.

Still another aspect of the invention is directed to a system for receiving a signal including an ability to eliminate noise from the signal using a digital filter defined by filter coefficients, comprising (A) an analog-to-digital converter to convert the signal to a discrete-time signal, and (B) at least one processor configured to process the discrete-time signal, the at least one processor configured to: (i.) identify a number of signal samples in the discrete-time signal, and use the signal samples to calculate autocorrelation values sufficient to calculate the filter coefficients, and (ii.) solve a system of equations, the system of equations defined by a Toeplitz matrix and a vector to determine the coefficient values, the Toeplitz matrix defined using the autocorrelation values, and the vector defined as the autocorrelation values of a white noise signal.

The number of signal samples may equal the number of filter coefficients. The number of signal samples may be greater than the number of filter coefficients.

In some embodiments, the white noise signal is an ideal, discrete-time, white-noise signal with variance equal to $R_{xx}(\tau=0)$.

The processor may be programmed to solve the system of equation by inverting the Toeplitz matrix. The processor may be programmed to solve the system of equation by populating a model of the inverted Toeplitz matrix. The processor may be programmed to solve the system of equations using a pseudo-inversion technique on the Toeplitz matrix.

In some embodiments, the processor is programmed to solve the system of equation using a product of an autocorrelation of a white noise signal and an inverse of the Toeplitz matrix.

The filter may be embodied in at least one of a microprocessor, a microcontroller, a field-programmable gate array (FPGA) or an application specific integrated circuit (ASIC), or a digital signal processor (DSP).

A still further aspect of the method is directed to a method of adaptively generating filter coefficients of a discrete-time, digital filter, for filtering a complex discrete-time signal using a digital filter defined by filter coefficients, comprising (A) identifying a number of signal samples in the discrete-time signal, and using the signal samples to calculate autocorrelation values sufficient to calculate the filter coefficients and (B) solving a system of equations, the system of equations defined by a Toeplitz matrix and a vector to determine the coefficient values, the Toeplitz matrix defined using the autocorrelation values, and the vector defined as the autocorrelation values of a white noise signal.

The number of signal samples may equal the number of filter coefficients. The number of signal samples may be greater than the number of filter coefficients.

In some instances, the white noise signal is an ideal, discrete-time, white-noise signal with variance equal to $R_{xx}(\tau=0)$.

The step of solving may comprise inverting the Toeplitz matrix. The step of solving may comprise populating a model of the inverted Toeplitz matrix. The step of solving may comprise using a pseudo-inversion technique on the Toeplitz matrix.

In some instances, the step of solving comprises calculating a product of an autocorrelation of a white noise signal and an inverse of the Toeplitz matrix.

As used herein, the term "attenuate", as in "filtering a signal to attenuate a signal component", is defined to mean providing an amplification factor of less than 1 (i.e., 1>amplification≥0).

These and other aspects of the present invention will become apparent upon a review of the following detailed description and the claims appended thereto.

DETAILED DESCRIPTION

The invention will be further illustrated with reference to the following specific examples. It is understood that these examples are given by way of illustration and are not meant to limit the claimed inventions.

Figure 1A:
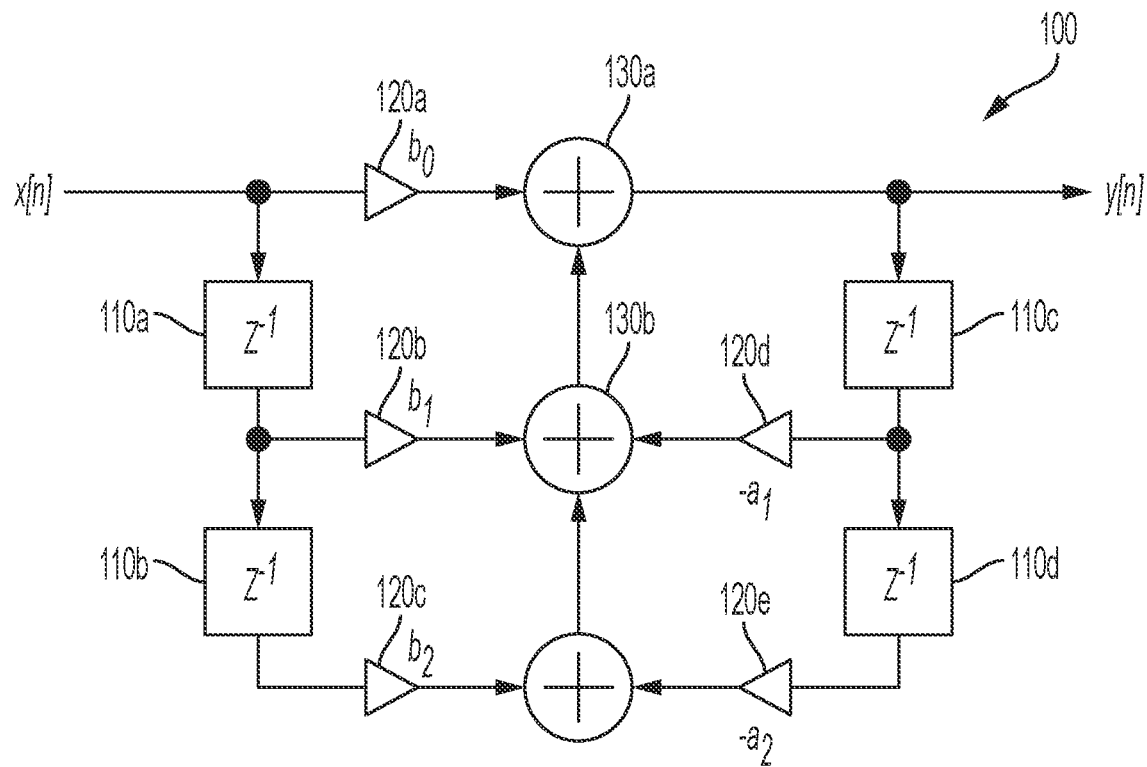
FIGS. 1A and 1B are general, representative, schematic illustrations of infinite impulse response digital filters.
Figure 1B:
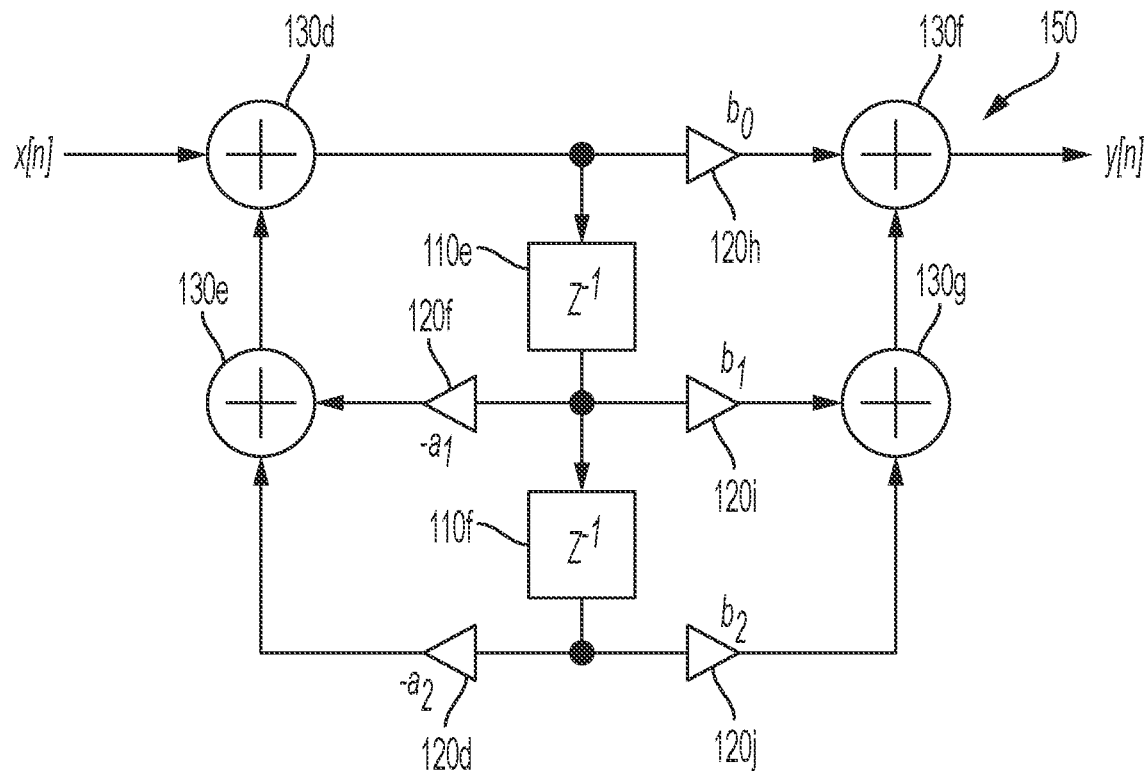
Figure 2:
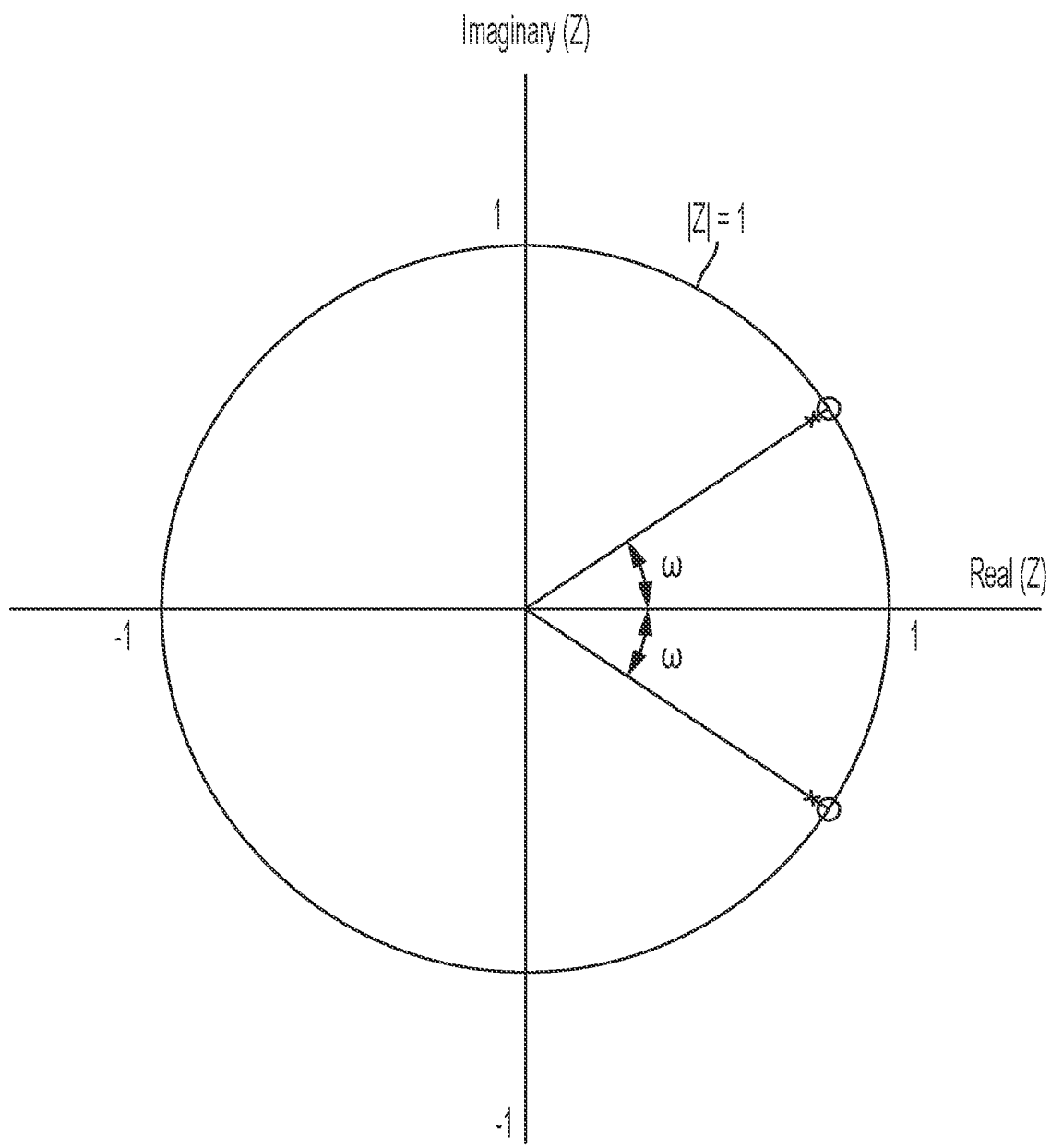
FIG. 2 is a graphical representation of a pole-zero configuration of an example of a conventional discrete-time notch filter.
Figure 3:
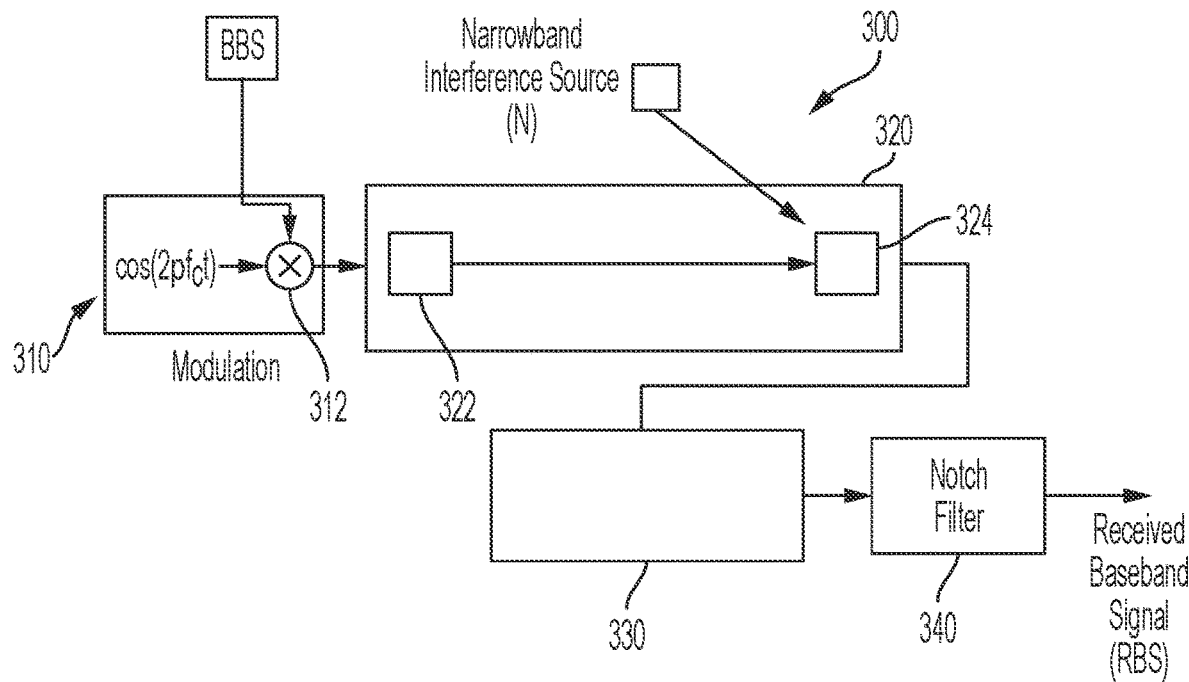
FIG. 3 is a schematic illustration of a signal transmission system in which a complex signal is processed by a notch filter according to aspects of the present invention.

FIG. 3 is a schematic illustration of a signal transmission system 300 in which a complex signal is processed by a notch filter 340 according to aspects of the present invention to attenuate a complex noise component from the signal. It is to be understood that, although the illustrated filter is capable of attenuating a complex noise component, the signal may be complex or real, and the noise component to be attenuated may be real or complex.

The illustrated system 300 comprises a modulator 310 which modulates a baseband signal BBS in a conventional manner using a mixer 312 to mix the baseband signal BBS with a sinusoidal carrier signal (e.g., $\cos(2\pi f_c t)$) of a selected carrier frequency $f_c$ to form a modulated signal to be transmitted. Transmission system 300 transmits the modulated signal from a first location to a second location using antennas 322, 324. Upon receipt of the signal at the second location, a demodulator 330 is used to demodulate the signal back to the baseband. During any of transmission, modulation or demodulation, noise tones N may be introduced into the signal by one or more noise sources N. Although illustrated as external to system 300, a noise source N may be external to system 300 or internal (i.e., noise arises from the components of system 300).

Typically, upon demodulation, an in-phase component (I) and a quadrature component (Q) of the received signal are obtained and added together to form a complex demodulated baseband signal. Typically, each of the in-phase and the quadrature components are afflicted with noise. As set forth in greater detail below, a filter according to aspects of the present invention is capable of attenuating a noise component (possibly a complex noise component) from the complex signal to produce a baseband signal having a higher signal-to-noise ratio. For example, demodulation may be achieved by mixing the modulated signal with a first signal from a first signal generator, and mixing the modulated signal with a second signal (from a second signal generator) 90-degrees out of phase with the first signal.

The signal may be sampled (i.e., digitized) at any time and location prior to filtering by filter 340 to form a discretely-sampled signal. For example the signal may be sampled at the carrier frequency or at an intermediate frequency prior to demodulation or at the baseband after demodulation by demodulator 330. It will be appreciated that, if the signal is digitized before demodulation, demodulation can be achieved using a discrete Hilbert transform. Although system 300 is illustrated with two antennas 322 and 324 at two different locations, it is to be understood that, in some embodiments of systems (e.g., radar system embodiments), the two locations may be at a same location or substantially a same location. In some instances, a single antenna may be multiplexed to send and receive the modulated signal.

The invention can also apply to signal systems providing modulation and demodulation but not using antennas to transmit signals (e.g., systems to communicate data over cable or fiberoptic lines) and including a modem. Demodulation may be achieved in any manner that generates a complex signal. For example, in an optical system, demodulation may be achieved using one or more interferometers.

In typical applications, the phase of the modulated signal is unknown as demodulation occurs. In some systems, the phase can contain useful information (e.g., quadrature amplitude modulation (QAM) communications schemes).

According to aspects of the invention, filter 340 has a transfer function as set forth in Equation 3.

$$H(Z^{-1}) = \frac{1 + a_1 z^{-1} + a_2 z^{-2} + \ldots + a_N z^{-N}}{1 + \rho a_1 z^{-1} + \rho^2 a_2 z^{-2} + \ldots + \rho^N a_N z^{-N}} \quad \text{Equation 3}$$

Like the transfer function of Equation 2, a filter having a transfer function as shown in Equation 3, is capable of eliminating N frequencies; however, because the number of zeros is also equal to N, it is not necessary to eliminate, both, a component and a complex conjugate of that component. Accordingly, filter 340 can attenuate complex noise signals and avoid distortion as would arise if both a signal component and the complex conjugate of the component were attenuated. According to Equation 3, the N coefficients $a_1 \ldots a_N$ define the locations of the zeros and the coefficients $a_1 \ldots a_N$ multiplied by a factor $\rho$ (where $\rho < 1$) define the location of the poles.

Figure 4A:
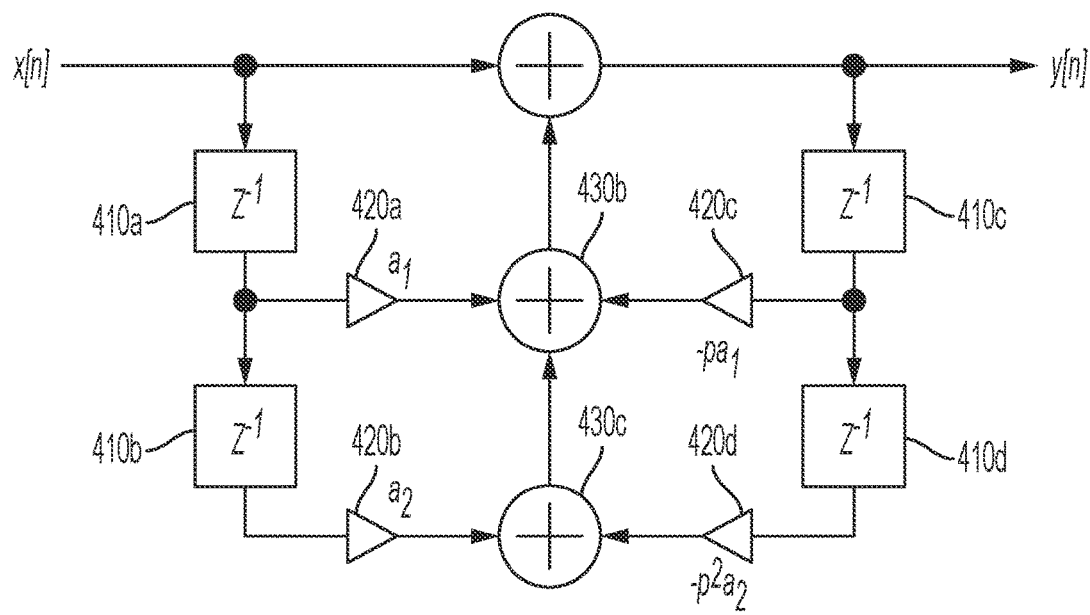
FIGS. 4A and 4B are schematic illustrations of two possible implementations of an example of a filter according to aspects of the present invention.
Figure 4B:
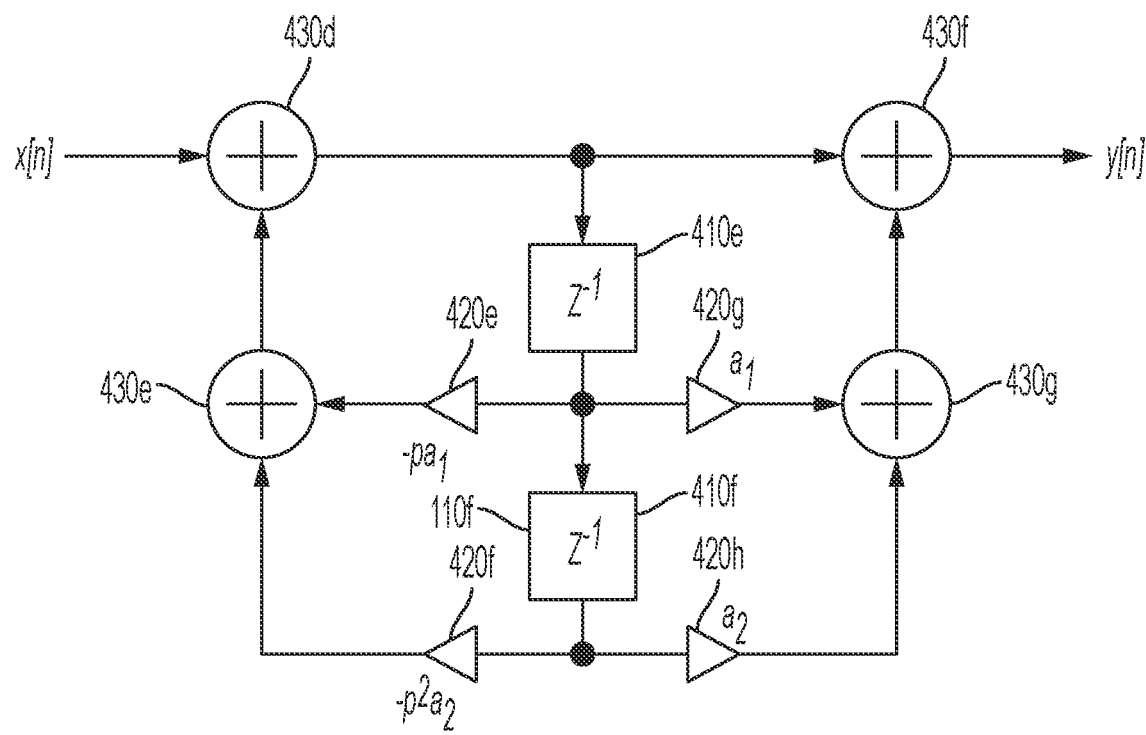

FIGS. 4A and 4B show two possible implementations of IIR filter 400 and 450 described by Equation 3. Filters 400 and 450 filter a discrete-time input signal x[n] in which delays 410a-410f provide selected amounts of delay to implement feedback and feedforward, and amplifiers 420a-420h provide attenuation factors $a_1$ and $a_2$ and $-\rho^2 a_2$. Adders 430a-430g combine the amplified signals to form an output signal y[n]. It is understood that the numbers of delays and amplifiers are selected to implement the filter of 4A and 4B, and the numbers can be varied to implement a selected filter. Also, it is understood that the topologies shown in FIGS. 4A and 4B allow for different implementations of a filter having a same transfer function.

Filters as described by FIGS. 4A and 4B can be implemented using conventional electronic components. For example, a general purpose microprocessor or a microcontroller may be programmed to embody filter 340 corresponding to the filters of FIGS. 4A and 4B and to produce a filtered output signal, or the filters may be embodied and a filtered output signal produced by a more specialized component such as a field-programmable gate array (FPGA) or an application specific integrated circuit (ASIC) or a digital signal processor (DSP) using conventional digital filtering techniques. Realization and application of a filter typically includes peripheral components such as memory to store filter coefficients or signal data or intermediate calculated information. Such peripheral components are not shown to avoid obfuscation.

It is well understood that a digital filter can be made to be an adaptive filter by modifying the coefficients of the digital filter depending on information extracted from the signal input into the filter or any other suitable source of information. In some embodiments, the coefficients are modified based on a signal after demodulation by demodulator 330; in such embodiments, a determination of the signal components to be attenuated is made based on the frequency components of the complex signal output after demodulation. Calculation of the coefficients can be made using a conventional technique or using a technique according to aspects of the present invention set forth below.

Figure 5:
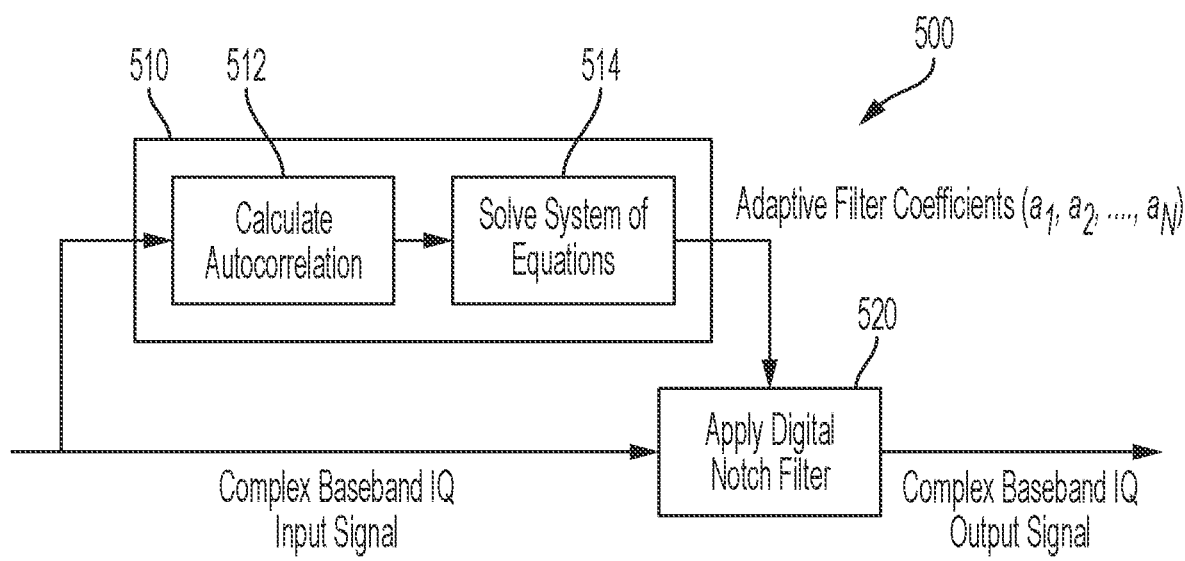
FIG. 5 is a partial schematic illustration of a filter subsystem including a coefficient calculation subsystem to be used to implement coefficient calculation according to aspects of the invention.

FIG. 5 is a partial schematic illustration of a filter subsystem 500 including a coefficient calculation subsystem 510 to be used to implement a coefficient calculation aspect of the invention. For example, such a filter subsystem may be used in a system such as the system of FIG. 3. In an embodiment of a signal transmission system including adaptive filtering according to aspects of the present invention, subsystem 500 replaces filter 340 in system 300 (shown in FIG. 3). Filter 520 may be a filter 340 as described above or any other suitable digital filter capable of adaptive variation.

Filter subsystem 500 comprises at least one processor configured to: receive the discrete-time signal (comprised of components I and Q, as described above) and calculate the filter coefficients; and filter the discrete-time signal based on the coefficients. In the illustrated embodiment, a coefficient calculation subsystem 510 receives the discrete-time signal and calculates autocorrelation values 512 and calculates the filter coefficients of a discrete-time, digital filter 520 by solving a system of equations 514 in a manner as set forth below. Filter 520 is configured to receive the discrete-time signal and filter the signal based on the filter coefficients.

Figure 6:
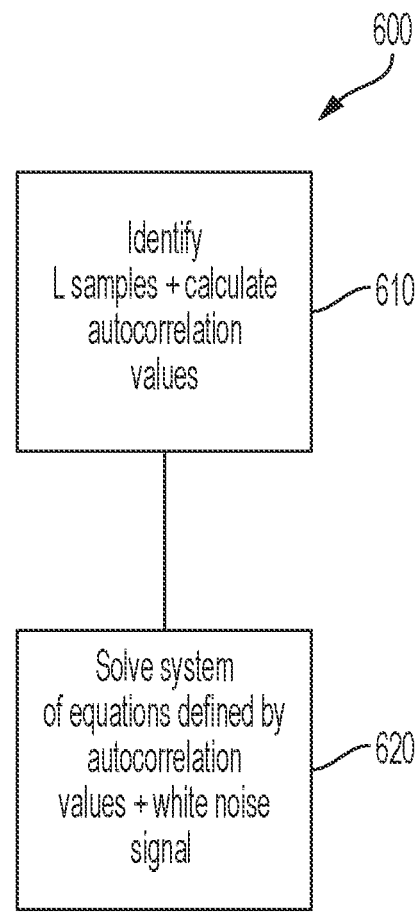
FIG. 6 is a flow chart illustrating an example of a method of generating filter coefficients of a discrete-time digital filter according to aspects of the present invention.

FIG. 6 is a flowchart 600 illustrating an example of a method of generating filter coefficients of a discrete-time digital filter.

At step 610, a predetermined number of signal samples (uniformly spaced in time) are identified in a discrete-time signal and the signal samples identified are used to calculate autocorrelation values sufficient to calculate the filter coefficients as set forth below. The number of samples L to be used is selected to be greater than the number of autocorrelation values M to be calculated; however, it will be appreciated that, in instances where the filter is to be adaptive to changing noise content of the signal, the number of samples to be used should be selected to be small enough that the most-current signal samples can substantially influence the coefficient calculations.

The number of coefficients is equal to the number of frequencies N to be attenuated. The number of frequencies to be attenuated is a predetermined number chosen according to the anticipated number of noise tones. While selecting a larger predetermined number allows for a larger number of tones to be filtered, a larger number results in increased calculation time and potential distortion of a signal. Autocorrelation calculation are made in a conventional manner using the Equation 4.

$$R_{xx}(\tau) = \sum_{n=1}^{L-M} x(n)x^*(n+\tau) \quad \tau = 0,1,\ldots,M \quad \text{Equation 4}$$

In some instances, for adaptive processes, the number of signal samples used to calculate the coefficients is at least 5 times the number of coefficients N. In the case of the notch filter of Equation 3, the number of coefficients is equal to the number of frequencies to be removed. For example, a notch filter designed to remove 2 frequencies should use a number of samples of at least L=10.

To be sufficient to allow calculation of the filter coefficients, the number autocorrelation values M is at least equal to the number of coefficients N. For example, the number of autocorrelation values M can be selected to provide a unique solution (i.e., the number of autocorrelation values M equals the number of coefficients N); however an over-constrained system of equations can be implemented where the number of autocorrelation values M is greater than N.

At step 620, a system of equations is solved, the system of equations defined by a Toeplitz matrix and a vector to determine the coefficient values. The Toeplitz matrix is defined using the autocorrelation values as shown in Equation 5; and the vector is defined as the autocorrelation values of a white noise signal as shown in Equation 5. For example, the white noise signal may be an ideal, discrete-time, white-noise signal with variance equal to $R_{xx}(\tau=0)$; however, it will be appreciated that other white-noise signals may be used to generate the autocorrelation values which may result in less efficient calculations.

For example, solving the system of equations can be accomplished by performing an inversion of correlation numbers in the Toeplitz matrix or by populating a model of the inverted matrix with appropriately-calculated numbers.

$$\begin{bmatrix} R_{xx}(0) & R_{xx}^*(1) & \ldots & R_{xx}^*(N) \\ R_{xx}(1) & R_{xx}(0) & \ldots & R_{xx}^*(N-1) \\ R_{xx}(2) & R_{xx}(1) & \ldots & R_{xx}^*(N-2) \\ \vdots & \vdots & & \vdots \\ R_{xx}(M) & R_{xx}(M-1) & \ldots & R_{xx}(0) \end{bmatrix} \begin{bmatrix} 1 \\ a_1 \\ a_2 \\ \vdots \\ a_N \end{bmatrix} = \begin{bmatrix} R_{xx}(0) \\ 0 \\ 0 \\ \vdots \\ 0 \end{bmatrix} \quad \text{Equation 5}$$

where $R^*_{xx}(n)$ is the complex conjugate of $R_{xx}(n)$

Alternatively, if M>N, a pseudo-inversion technique may be used to solve for the coefficients.

If an inverted Toeplitz matrix is obtained, it will be appreciated that the coefficients of discrete-time digital filter can be calculated as a product of an autocorrelation of white noise input and the inverse Toeplitz matrix as shown in Equation 6.

$$\begin{bmatrix} 1 \\ a_1 \\ a_2 \\ \vdots \\ a_N \end{bmatrix} = \begin{bmatrix} R_{xx}(0) & R_{xx}^*(1) & \ldots & R_{xx}^*(N) \\ R_{xx}(1) & R_{xx}(0) & \ldots & R_{xx}^*(N-1) \\ R_{xx}(2) & R_{xx}(1) & \ldots & R_{xx}^*(N-2) \\ \vdots & \vdots & & \vdots \\ R_{xx}(M) & R_{xx}(M-1) & \ldots & R_{xx}(0) \end{bmatrix}^{-1} \begin{bmatrix} R_{xx}(0) \\ 0 \\ 0 \\ \vdots \\ 0 \end{bmatrix} \quad \text{Equation 6}$$

where column vector $[R_{xx}(0), 0, 0 \ldots 0]$ is recognized as an autocorrelation of white noise signal.

However, alternative techniques for solving the system of equations may be used, such as, Cramer's rule.

Referring again to FIG. 5, the coefficient calculation subsystem 510 is configured to receive the discrete-time signal and to carry out the tasks as identified in FIG. 6. In addition to performing the tasks of FIG. 6, the at least one processor is configured to receive the discrete-time signal and to apply the filter to the discrete-time signal based on the coefficients. The filter is applied to the signal in a conventional manner using a difference equation.

It will be understood that each of the various tasks can be carried out by one or more processors and divided among the one or more processors in an suitable manner. The at least one processor may comprise a general purpose microprocessor or a microcontroller (i.e., using software), or may be implemented in a more specialized component such as a field-programmable gate array (FPGA) or an application specific integrated circuit (ASIC) or a digital signal processor (DSP). Realization and application of a filter typically includes peripheral components such as memory to store filter coefficients or signal data or intermediate calculated information. Since use of these peripheral components would be readily implemented by one of ordinary skill, they are omitted from FIG. 5 to avoid obfuscation.

It is generally known that, to achieve complete nulling of a complex frequency (z) (corresponding to an angular location in the z plane), a zero should be located on the on the unit circle (i.e., /z/=1) in the z-plane. It will be understood that coefficient calculation using the transfer equations of Equation 3 and the techniques set forth above may give rise to a filter having zeros located inside the unit circle in the plane thus providing less than complete nulling of the frequency.

Figure 7:
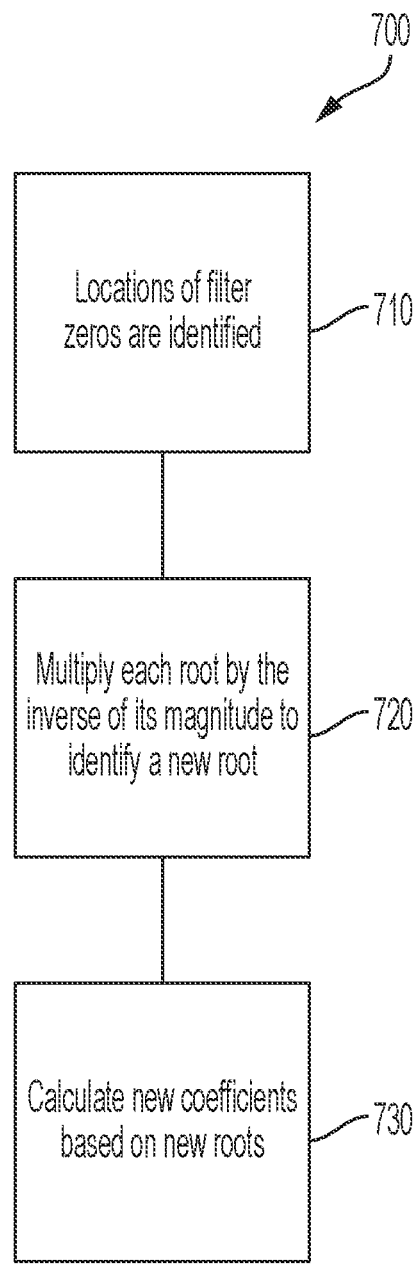
FIG. 7 is a flow chart illustrating an example of a method of generating filter coefficients of a discrete-time digital filter according to aspects of the present invention such that the zeros are moved closer to the unit circle

Although in some instances complete nulling is not necessary, in some instance it may be desirable to modify the zeros and coefficients of a filter such that the zeros of filter are closer to the unit circle than as specified by the process set forth above. FIG. 7 is a flow chart illustrating an example of a method 700 of generating filter coefficients of a discrete-time digital filter according to aspects of the present invention such that filter coefficients can be modified to provide zeros closer to or onto the unit circle. At step 710, the location(s) of the filter's zero(s) is/are found (e.g., the roots of the polynomial formed by the filter coefficients are found using Equation 3). For example, finding roots from a polynomial's coefficients can be done using Newton's method or other root-finding algorithm, such as the quadratic formula, if the polynomial is a second order polynomial.

At step 720, each complex root is multiplied by the inverse of its magnitude (i.e., the square root of the sum of the squares of each of the real component and imaginary component) to get a new root at the same angle in the z-plane as the original root, but that lies on the unit circle (i.e. have a magnitude equal to one). At step 730, new filter coefficients are calculated from the new roots by performing an inverse transform of the resultant transfer function (e.g., using discrete convolution).

It will be appreciated that, due to limitations of digital calculation, performing the steps of method 700 may not result in a filter having zeros precisely located on the unit circle, or distortion to the angle of the new roots in the z-plane (which impacts the accuracy of the frequency that is notched out). Specifically, while step 710 and step 720 can each involve iterative calculations (i.e. root finding and division) to improve accuracy, the iterations may not provide a desired level of accuracy in a reasonable amount of time.

While method 700 provides a technique for locating zeros of a filter closer to or on the unit circle and thereby decreasing the residual noise in a signal, the increased calculations associated with a such a technique may result in an unacceptable increase in latency in providing a filtered output signal or an unacceptable increase in computational resource usage, which can negatively impact performance or cost. In such instances, it may be beneficial to implement processes that constrain the locations of the filter's zeros as the filter coefficients are calculated using Equation 6 (i.e., such that method FIG. 7 is not necessary).

For example, in instances where two tones (N=2) are to be removed, and the two tones are spaced apart in frequency by an interval equal to the Nyquist frequency (i.e. half the sampling frequency of the discrete time input x[n]), coefficients can be calculated using the following technique to obtain coefficients of a filter having zeros on the unit circle. It is to be appreciated that noise tones having such a spacing of frequencies commonly arise in instances when demodulation is performed using a Hilbert transform and the signal prior to demodulation is subject to a DC bias.

In such instances, the locations of the zeros of a filter in z-plane can be constrained to the unit circle by calculating auto-correlation values using Equations 7-9.

$$R_{xx}[0] = 1 \quad \text{Equation 7}$$

$$R_{xx}[1] = 0 \quad \text{Equation 8}$$

$$R_{xx}[2] = \frac{\sum_{n=1}^{L-2} x[n]x^*[n+2]}{\left|\sum_{n=1}^{L-2} x[n]x^*[n+2]\right|} \quad \text{Equation 9}$$

Accordingly, step 610 of flowchart 600 discussed above is modified by Equations 7-9. After calculating the autocorrelation values using Equations 7-9, the remainder of the process as described with reference to FIG. 6 is used to calculate the filter coefficients.

Although various embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A signal transmission system, comprising:
 a demodulator to receive a modulated signal and form a complex baseband signal; and
 a filter to remove one or more noise components from a digital representation of the baseband signal, the filter having one or more zeros at one or more complex frequencies corresponding to the one or more noise components, and the filter not having a zero at a complex conjugate of the one or more complex frequencies.

2. The system of claim 1, wherein the filter is described by a transfer function of $$H(z^{-1}) = \frac{1 + a_1 z^{-1} + a_2 z^{-2} + \ldots + a_N z^{-N}}{1 + \rho\, a_1 z^{-1} + \rho^2 a_2 z^{-2} + \ldots + \rho^N a_N z^{-N}}$$

where z is a complex-frequency variable, the coefficients $a_1 \ldots a_N$ define the location of zeros of the transfer function, and the coefficients $a_1 \ldots a_N$ multiplied by a factor $\rho$ (where $\rho<1$) define the location of poles of the transfer function.

3. The system of claim 1, wherein the demodulator is configured to demodulate the modulated signal by mixing the modulated signal with a first signal and mixing the modulated signal with a second signal that is 90-degrees out of phase with the first signal.

4. The system of claim 1, further comprising an analog-to-digital convertor to sample the signal prior to demodulation by the demodulator, and wherein the demodulator uses a discrete Hilbert transform.

5. The system of claim 1, including an analog-to-digital convertor to sample the signal after demodulation by the demodulator to form the digital representation.

6. The system of claim 1, wherein the at least one of the noise components is produced by a noise source that is external to the system.

7. The system of claim 1, wherein the transmission system is a radar system.

8. The filter of claim 1, wherein the filter is embodied in at least one of a microprocessor, a microcontroller, a field-programmable gate array (FPGA) or an application specific integrated circuit (ASIC), or a digital signal processor (DSP).

9. The filter of claim 1, wherein the filter is an adaptive filter.

10. The filter of claim 9, further comprising a coefficient calculation subsystem comprising at least one processor configured to receive the discrete-time signal, the at least one processor configured to:
 (i.) identify a number of signal samples in a discrete-time signal, and use the signal samples to calculate autocorrelation values sufficient to calculate filter coefficients of the filter, and
 (ii.) solve a system of equations, the system of equations defined by a Toeplitz matrix and a vector to determine the coefficient values, the Toeplitz matrix defined using the autocorrelation values, and the vector defined as the autocorrelation values of a white noise signal.

11. A method of removing N narrowband signal components from a signal, the method comprising:
processing a digital representation of the signal with a filter having a transfer function of $$H(z^{-1}) = \frac{1 + a_1 z^{-1} + a_2 z^{-2} + \ldots + a_N z^{-N}}{1 + \rho\, a_1 z^{-1} + \rho^2 a_2 z^{-2} + \ldots + \rho^N a_N z^{-N}}$$

where z is a complex-frequency variable, the coefficients $a_1 \ldots a_N$ define the location of zeros of the transfer function, and the coefficients $a \ldots a_y$ multiplied by a factor $\rho$ (where $\rho < 1$) define the location of poles of the transfer function, to remove the N components from the signal.

12. The method of claim 11, wherein at least one of the components is a complex sinusoid.

13. The method of claim 11, further comprising demodulating a modulated representation of the signal prior to the processing step to form a demodulated representation of the signal.

14. The method of claim 13, further comprising sampling the demodulated representation of the signal after the step of demodulating.

15. The method of claim 13, further comprising sampling the demodulated representation of the signal prior to the step of demodulating, wherein the step of demodulating is accomplished using a discrete Hilbert transform.

16. The method of claim 11, wherein the method is performed in a radar system.

17. A discrete-time, digital filter for notch filtering a complex digital signal, the filter having a transfer function of $$H(z^{-1}) = \frac{1 + a_1 z^{-1} + a_2 z^{-2} + \ldots + a_N z^{-N}}{1 + \rho a_1 z^{-1} + \rho^2 a_2 z^{-2} + \ldots + \rho^N a_N z^{-N}}$$

where z is a complex-frequency variable, the coefficients $a_1 \ldots a_N$ define the location of zeros of the transfer function, and the coefficients $a_1 \ldots a_N$ multiplied by a factor $\rho$ (where $\rho < 1$) define the location of poles of the transfer function.

18. The filter of claim 17, wherein the filter is embodied as an adaptive filter.

19. The filter of claim 17, wherein the filter is embodied in a microprocessor or a microcontroller.

20. The filter of claim 17, wherein the filter is embodied in a field-programmable gate array (FPGA) or an application specific integrated circuit (ASIC).

* * * * *